United States Patent Office 3,441,640
Patented Apr. 29, 1969

3,441,640
PROCESS FOR WET-SPINNING
POLYBENZIMIDAZOLES
Joseph G. Santangelo, Morristown, N.J., assignor to Celanese Corporation, New York, N.Y., a corporation of Delaware
No Drawing. Filed Dec. 7, 1964, Ser. No. 416,593
Int. Cl. D06m 5/04
U.S. Cl. 264—203                8 Claims

ABSTRACT OF THE DISCLOSURE

A process is provided for the wet spinning of shaped articles by spinning a solution of polybenzimidazole in sulfuric acid into a coagulation bath containing sulfuric acid at a concentration lower than that in the spinning solution.

---

This invention relates broadly to compositions comprising a solution of a condensation polymer, more particularly a linear condensation polymer consisting of recurring structural units containing aromatic nuclei and/or heterogeneous cyclic nuclei with or without intervening atoms or groups such as, for example, O, S, Se, —NH—, or divalent hydrocarbon radicals, for instance the various alkylene (including cycloalkylene), arylene, aralkylene and alkarylene radicals, etc. The scope of the invention also includes a preferred use of the solutions of the invention, for instance in making shaped products such as, for example, filaments (both mono- and multifilaments), yarns, rods, films, sheets, etc., therefrom.

The preferred condensation polymers used in practicing the present invention are the fiber-forming (fiber-formable), linear polybenzimidazoles (PBI). Such polymers and their preparation are more fully described in U.S. Patent No. 2,895,948, dated July 21, 1959, and in the Journal of Polymer Science, vol. 50, pages 511–539 (1961), and which by this cross-reference are made a part of the disclosure of the instant invention. Other polymers that also may be used are the fiber-formable, linear polyimides, polybenzothiazoles and polyquinoxalines.

There exists a wide variety of synthetic condensation polymers which are suitable for the manufacture of shaped articles, e.g., filaments and fibers for the manufacture of textiles, films, and other products. Many of these polymers have repeating —CONR— groups, where R is hydrogen or a monovalent organic radical, e.g., a hydrocarbon radical such as lower alkyl. These include the polyamides proper, e.g., the nylons, wherein the —NRCO— groups are attached to carbon atoms on each side, the polyurethanes which contain repeating

—NRCOO— groups, the polyureas which contain repeating

—RNCONR— groups, and similar condensation polymers. The usual method of forming these polymers into shaped articles such as filaments and films is to extrude the melted polymer through suitably shaped openings having at least one thin dimension, e.g., the orifices of a spinnerette in the case of the melt spinning of filaments or a slot in the case of film formation.

While melt-spinning and melt-extrusion techniques are perfectly suitable for many of the aforementioned polymers, there exist other polymers that are sometimes designated as "difficulty meltable" polymers to which such techniques cannot easily be applied. For example, in the case of polymers having high-melting and/or high decomposition points, more particularly those melting and/or decomposing above 210° C. and especially above 275° C., e.g., the polyimides, polybenzimidazoles, polybenzothiazoles, polyquinoxalines, and others of the kind broadly described in the first paragraph of this specification, the polymer may begin to degrade seriously at a temperature very close to the melting point (in the case of polymers that melt under heat) and/or the polymer may further polymerize to a useless infusible mass. However, because of the desirable properties of the heat-resistant polyimides, polybenzimidazoles, polybenzothiazoles, polyquinoxalines and the like, e.g., a combination of dye receptivity, high-temperature resistance, superior mechanical properties and water insensitivity as indicated, for example, by high wet stiffness and low boil-off shrinkage, not often found in the more common polymers which can be melt spun, any method that can be used to form such polymers into useful shaped articles such as filaments and films is much to be desired.

In accordance with one aspect of the present invention a difficultly-soluble polymer from the class or group consisting of the polyimides, the polybenzimidazoles, the polybenzothiazoles and the polyquinoxalines, and more particularly such polymers which are linear and are fiber-formable (fiber-forming), are dissolved in sulfuric acid containing, by weight, at least 60% $H_2SO_4$, more particularly from 80 or 85% to 100% $H_2SO_4$, and preferably from 95% to 100% $H_2SO_4$. The preferred linear condensation polymer is a linear polybenzimidazole, and more particularly such a polymer having an inherent viscosity of at least 0.4, e.g., from 0.4 to about 1.5, as measured by a 0.5% solution in m-cresol. For a definition of the term "inherent viscosity," see the aforementioned U.S. Patent No. 2,895,948, column 4, lines 1–14.

The preferred linear condensation polymers, more particularly the aforementioned linear polybenzimidazoles, are prepared by, for example, heating at a temperature of 100° C. to 300° C., in the absence of oxygen, substantially equivalent quantities of (a) bis-ortho-diaminophenyl compounds having formulae of the group consisting of (A)

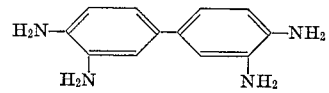

and (B)

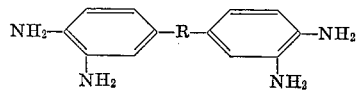

wherein R is a divalent hydrocarbon radical, and (b) a saturated aliphatic or an aromatic dioic acid, and recovering a high-molecular-weight polybenzimidazole having an inherent viscosity of at least 0.4, as measured by a 0.5% solution in m-cresol, from the resulting reaction mass.

The polybenzimidazoles, when shaped in accordance with the instant invention, exhibit a particularly good combination of properties, e.g., good mechanical properties such as toughness, tenacity and elongation, water insensitivity as indicated by high wet stiffness and low shrinkage, and high sensitivity to disperse and acid dyes.

Furthermore, they retain these properties at high temperatures.

The reaction of a carboxylic acid group with an ortho-diaminophenyl group yields a benzimidazole ring that can be employed to form linear condensation polymers having the desirable combination of properties described above and in the aforementioned U.S. Patent No. 2,895,948. The ortho-diaminophenyl groups react rapidly to form an imidazole group, and result in the formation of linear polymers wherein compounds having two benzimidazole-forming groups in the molecule are condensed.

Suitable polybenzimidazoles used in practicing the present invention are those consisting of recurring units represented by the formula (I)
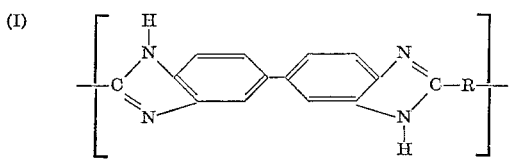

where R represents a divalent hydrocarbon radical, and those consisting of recurring units represented by the formula (I)
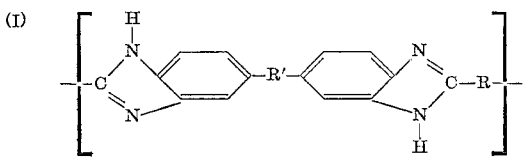

where R and R' each represent a divalent hydrocarbon radical.

Illustrative examples of divalent hydrocarbon radicals represented by R in Formula I and by R and R' in Formula II are the divalent aliphatic (including cycloaliphatic) hydrocarbon radicals e.g., methylene, ethylene, propylene through dodecylene (both normal and isomeric forms), and higher members of the homologous series, if desired, cyclopentylene, cyclohexylene, cycloheptylene, etc.; divalent aromatic hydrocarbon radicals, e.g., phenylene, naphthylene, etc.; divalent aliphatic-substituted aromatic hydrocarbon radicals, e.g., 2,4-tolylene, ethyl-2,5-phenylene, isopropyl-3,4-phenylene, 1-butyl-2,4-naphthylene, etc.; divalent aromatic-substituted aliphatic hydrocarbon radicals, e.g., phenylethylene, phenylpropylene, naphthylisobutylene, xylylene, alpha-(4-tolylene)-beta'-butyl, etc.; and radicals that may be classed as either divalent aromatic-substituted aliphatic or divalent aliphatic-substituted aromatic hydrocarbon radicals, e.g., 4,alpha-tolylene, 3,beta-phenyleneethyl,4,alpha-xylylene, 2,gamma-phenylenebutyl, etc. Thus, the divalent hydrocarbon radicals represented by the aforementioned R and R' may be one represented by the formula —Ar—R''—Ar— where Ar represents a arylene radical and R'' represents an alkylene radical.

In cases where possible polymerization through, or other reaction through or at a double-bonded carbon atom in an aliphatic chain are unobjectionable, the divalent hydrocarbon radicals represented by the aforementioned R and R' may be divalent ethylenically-unsaturated aliphatic hydrocarbon radicals, e.g., propenylene, isopropenylene, butenylene, cyclopentenylene, cyclohexenylene, etc.; or the ethylenic unsaturation may be in the aliphatic chain of a divalent aliphatic-substituted aromatic hydrocarbon radical as in, for example, allyl-2,5-phenylene; or in the aliphatic chain of a divalent aromatic-substituted aliphatic hydrocarbon radical as in, for instance, phenylpropenylene.

The following equation illustrates how polybenzimidazoles of the kind embraced by Formulas I and II are formed:

(III)
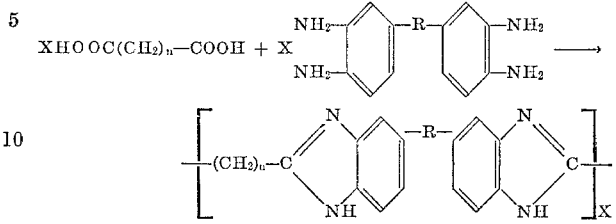

In the above equation R represents a member of the group consisting of diphenyl bonds (that is, R is 0) and divalent hydrocarbon radicals, numerous examples of which have been given hereinbefore; and $n$ represents a whole number, advantageously at least 3, e.g., from 3 to 12 or more, and preferably from 4 to about 8 or 9.

A preferred benzimidazole used in practicing the instant invention is linear poly-[2,2'-(m-phenylene)-5,5'-bibenzimidazole]. This polymer is prepared, for instance, by reaction between a tetramine, more particularly a diaminobenzidine, and diphenyl isophthalate as illustrated by the following equation:

(IV)
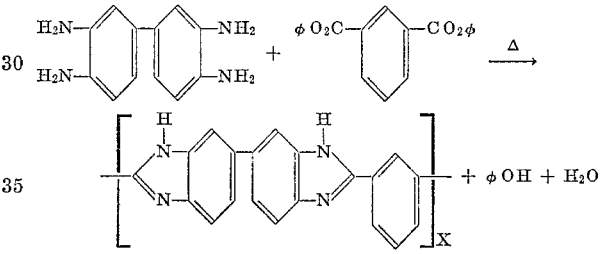

Note: $\phi$=phenyl.

For information concerning the preparation of the polyimides, e.g., poly-[N,N'-(p,p'-oxydiphenylene)pyromellitimide] the polybenzothiazoles, e.g. poly-[2,2'-(1,3-phenylene)-6,6'-bibenzothiazole], and the polyquinoxalines, e.g., poly[-2,2'-(1,4-phenylene)-6,6'-biquinoxaline], and the formulas for such high-melting polymers, see Chemical and Engineering News, 42, 15, 55–57 (Apr. 13, 1964), and the original papers on the same subject presented at the 147th National Meeting of the American Chemical Society in Philadelphia, Pa., in April 1964. All of these polymers, like the polybenzimidazoles, can be prepared in molecular weights corresponding to that represented by an inherent viscosity of at least 0.4 as measured by a 0.5% solution in m-cresol.

In accordance with another aspect of the invention, shaped articles such as filaments and films of the high-melting linear polymers with which this invention is concerned are obtained by precipitating the said polymer in approximately its desired shape from a solution thereof in sulfuric acid containing at least 60%, preferably at least about 70 or 80%, by weight of $H_2SO_4$ by contacting the said solution with a liquid coagulant for the said polymer thereby to obtain a gelled, shaped product, more particularly gelled filamentary material. Thus, one may extrude a solution of the polymer in sulfuric acid of the aformentioned concentration through an enclosed space of predetermined shape, and having at least one thin dimension, into a liquid coagulating bath comprising an aqueous solution of sulfuric acid having an acid concentration considerably lower than that of the acid in which the polymer was dissolved, but always such (i.e., sufficiently low) that the polymer is coagulated into a shaped article. Moreover, it has been found that the properties of the resulting shaped articles, e.g., filaments, are materially influenced by the sulfuric acid concentration of the liquid coagulating or spin bath. The temperature of the liquid coagulant comprising sulfuric acid also usually has a material influence on the properties of the shaped articles.

The concentration of sulfuric acid in the liquid coagulating bath may be varied considerably depending on various modifications of the process. Thus, when the polymer is dissolved in, for example, an aqueous solution of sulfuric acid containing at least about 75% or 80% or more of $H_2SO_4$, the coagulating bath may comprise, for instance, sulfuric acid containing from about 35% to about 65%, more particularly from about 40% to about 60%, e.g., approximately 50%, by weight of $H_2SO_4$. At concentrations of $H_2SO_4$ in the liquid coagulant lower than 40%, additives also are usually present in the said coagulant.

The temperature of the liquid coagulant with which the extruded soltuion of the polymer is contacted, as by immersion in a bath of the said coagulant, is generally within the range of from about 20° C. to 100° C., more particularly from about 30° C. to about 90° C., and usually preferably from about 40° C. to about 60° C., e.g., approximately 50° C.

The temperature of the extrudable composition, e.g., spinning solution, also is generally within the range of from about 20° C. to 100° C., more particularly from about 30° or 40° C. to about 80° or 90° C. Extrusion temperatures above 100° C., e.g., up to the boiling temperature of the acid solution of the polymer are not precluded.

The extrudable compositions, more particularly solutions, of the fiber-formable linear polymers are prepared merely by dissolving, with the aid of agitation and heat, the polymer in the form of flakes or finely divided or pulverized polymer, e.g., of 100- to 300-mesh fineness and finer (U.S. Standard Sieve Series screen), in the aforementioned concentrated sulfuric acid. The concentration of the linear polymer in the concentrated sulfuric acid is usually within the range of from about 5% to about 30%, more particularly from about 6 or 7% to about 20 or 25% by weight. Obviously, the concentration may be less than 5%, but economic considerations usually are unfavorable to the use of such relatively low concentrations. The use of concentrations above 30% is not precluded so long as an extrudable composition is obtained that can be extruded through a shaped orifice or opening, that is, an orifice or opening of predetermined shape, without the use of unreasonably high pressures.

In preparing the solution of the linear polymer in sulfuric acid, one is not limited only to the use of sulfuric acid within the concentration ranges hereinbefore specified. Thus, if desired, one may use fuming sulfuric acid, e.g., such acid containing 6 or 7% or more by weight of free sulfur trioxide.

The polymer compositions or solutions of this invention may also be wet spun into coagulating or spin baths other than aqueous sulfuric acid. For example, at spin-bath temperatures around 20° C. the sulfuric acid solutions of this invention, e.g., of a polybenzimidazole, may be extruded into aqueous formic acid of 52 to 68% by weight formic acid concentration or into aqueous acetic acid of 52 to 63% by weight concentration. The solutions may also be extruded into spin baths of aqueous formic or acetic acid having a considerably higher temperature, e.g., 35° to 55° C. in which case lower acid concentrations in the spin bath may be used.

The liquid coagulant may be circulated so that it travels concurrently with the filaments, e.g., in a tube, in order to minimize turbulence in the liquid surrounding the filaments and thus prevent rupture or, in the case of multifilament spinning, adhesion of the filaments to each other. This is especially useful for processes wherein the spun filaments travel in a generally horizontal direction.

Another modification that is particularly useful for horizontal spinning is to cause a gentle upward stream of liquid coagulant in the vicinity of the spinnerette. This minimizes sag in the filaments caused by the fact that the material being extruded has a considerably higher specific gravity than the liquid of the spin bath.

The wet-spinning process of this invention, especially when the spin bath is aqueous sulfuric acid, results in little or no degradation of the polymer as indicated by its inherent viscosity, particularly when the concentration of $H_2SO_4$ in the solvent is at least 90% and the spinning solution is not subjected to elevated temperatures for long periods of time.

After leaving the coagulating bath the shaped product, e.g., filamentary material, is carried through other processing steps including, for example, drawing or stretching, drying, hot shoe or hot pin drawing after drying, etc. Hot shoe or hot pin drawing at temperatures up to 500° C. and relaxing at temperatures up to 500° C. is advantageous in order to impart maximum tensile properties to the filamentary material.

Filaments may be produced by the process of this invention that have widely varying deniers after stretching the gelled filamentary material and drying the stretched material, e.g., in the range of 0.1 to 50, preferably 1 to 16, denier per filament. Although filaments extruded from round orifices have, in general, a round smooth cross-section, filaments having other cross-sectional shapes may be produced by means of orificers having other than round shapes. The filaments of, for example, a polybenzimidazole, have a generally similar appearance throughout different portions of their interior as determined by the examination of different cross-sections of these filaments with an optical microscope. The filaments may have a number of small voids uniformly distributed throughout their interiors or they may be substantially completely free from voids.

The mechanical properties of the shaped articles, e.g., filaments, produced in accordance with the process or method of this invention may be improved by drawing or stretching the filamentary material, preferably at an elevated temperature, and then annealing. For example, the filaments may be stretched from as little as 5 or 10% up to 500 or 600% (or more) increase in their original length at a temperature of from about 20° C. up to a temperature of about 450°–500° C. Such drawing or stretching causes the molecules making up the shaped article, e.g., filaments, to become somewhat molecularly oriented along the fiber axis, thereby to increase the tensile strength of the gelled filamentary material. Molecular packing may be subsequently induced or increased by heating the stretched filamentary material at an annealing temperature, e.g., at a temperature within the range of from about 200° to 500° C. or more, depending upon the chemical composition and physical properties of the particular filamentary material.

The monofilament or multifilament bundle may be drawn in air or in a second bath of a liquid medium, e.g., water containing from 0% to about 30% by weight of $H_2SO_4$, at temperatures up to the boiling point of the liquid. The latter technique is economical and practical for use in a continuous stretching operation that is carried out directly on a spinning machine. Other liquid media that may be used for stretching are tetralin, benzene, toluene, heptane, methanol, water-methanol mixtures, acetone, water-acetone mixtures, ethylene glycol, etc.

If the liquid medium in which the filamentary material is stretched is other than water or a gaseous medium such as air, then the stretched filaments are usually washed, e.g., with water, to remove the excess liquid stretch-bath medium. The wet filaments are then dried, e.g., at temperatures ranging from ambient temperature (20°–30° C.) to 105° C. or a little higher, as desired or as conditions may require.

The smooth filaments resulting from the method of this invention may be used, for example, in tire cords where their smooth cross-section enables them to be packed very tightly to form dense, strong cords. Of course, the filaments also can be used in other applications, for instance in making yarns, cords, ropes, as well as in making other textile materials such as woven and non-woven fabrics, tapes ribbons, etc.

In order that those skilled in the art may better understand how the present invention can be carried into effect, the following examples are given by way of illustration and not by way of limitation. All parts and percentages are by weight unless otherwise stated.

EXAMPLE 1

(A) Preparation of poly-[2,2'-(m-phenylene)-5,5'-bibenzimidazole]

The polymer is prepared as described in the Journal of Polymer Science, vol. 50, page 533 (1961).

A mixture of 4.28 g. (0.02 mole) of diaminobenzidine and 6.36 g. (0.02 mole) of diphenyl isophthalate is melted at 220° C. The reaction is initiated upon heating to 260° C., and heating is continued at this temperature for 30 minutes. Pressure reduction to 0.1 mm. Hg produces a glassy foam and results in the removal of most of the liberated phenol and water. After 30 minutes, the foamed reaction mass is pulverized and then reheated at 0.1 mm. Hg pressure for 9 hours while the temperature is gradually raised from 280° C. to 400° C. The inherent viscosity in formic acid of the resulting polymer is 3.34. A 0.5% solution of the polymer in dimethylsulfoxide shows an inherent viscosity of 1.02.

(B) Preparation of spinning solution

Powdered polymer from (A) portion of this example is added to commercial concentrated sulfuric acid at room temperature (20°–30° C.) and mixed for 2 hours. The amount of polymer employed is such as to yield a spinning dope containing about 23.9% polymer and having a viscosity of less than 1500 poises as measured at 25° C. using a Brookfield viscometer. The dope is then centrifuged for 20 minutes and placed in a spinning bomb. Prior to spinning the dope is deaerated for 30 minutes at 5 mm. Hg pressure.

In a similar manner spinning dopes of higher or lower concentrations of polymer can be produced, for instance in concentrations as described in the portion of this specification prior to the examples, and with higher or lower viscosities than that described in the preceding paragraph.

(C) Preparation of filamentary material

Spinning dope prepared as described in the (B) portion of this example is extruded through a 1-inch jet, containing ten holes each having a diameter of 0.200 mm., using a nitrogen pressure of 150 p.s.i.g. The dope is extruded into a 100% water bath in which coagulation occurs very rapidly. This is followed by an after-stretch in (1) a mixture of 50% water and 50% $H_2SO_4$; (2) 100° C. steam; and (3) 100° C. water.

The spinning is also repeated using a coagulating bath of a mixture of 50% water and 50% $H_2SO_4$. The coagulating bath temperatures are varied from room temperature (25° C.) to 65° C. Extrusion speeds are varied from 5 to 10 meters per minute to about 30 meters per minute.

The resulting filamentary material is then washed in hot water for 12 hours and dried at 120° C.

Runs similarly made which include continuous hot shoe drawing of the dried filaments yield filamentary material having tenacities of 4.5 g./d. and above, and elongations of 15% and higher, together with the heat resistance and other improved properties hereinbefore described.

Instead of using poly-[2,2'-(m-phenylene)-5,5'-bibenzimidazole] as described under (B) and (C) of Example 1, one may substitute any of the other polybenzimidazoles of the kind embraced by Formulas I and II and by the formula to the right of the arrow in Equation III. Specific examples of such polybenzimidazoles are those obtained by (a) the condensation of 2,2-bis(3,4-diaminophenyl)propane with sebacic acid; (b) the condensation of 3,3'-diaminobenzidine with sebacic acid; (c) the condensation of 2,2 - bis(3,4 - diaminophenyl)propane with adipic acid; and (d) the condensation of 1,2-bis(3,5-diaminophenyl)ethane with sebacic acid.

EXAMPLE 2

Essentially the same procedures are followed as in (B) and (C) of Example 1 with the exception that, in making up the spinning solution of (B) wherein the linear polymer is 100% poly - [2,2' - (m-phenylene)-5,5'-bibenzimidazole], there is used a finely divided (pulverized mixture of, by weight, 90% of the said benzimidazole and 10% of a polyquinoxaline, specifically poly - [2,2'-(1,4-phenylene)-6,6'-biquinoxaline]. Similar results are obtained.

EXAMPLE 3

Essentially the same procedures are followed as in (B) and (C) of Example 1 with the exception that, in making up the spinning solution of (B) wherein the linear polymer is 100% poly-[2,2' - (m-phenylene)5,5' - bibenzimidazole], there is used a finely divided (pulverized) mixture of, by weight, 92.5% of the said benzimidazole and 7.5% of a polyimide, specifically poly-[N,N'-(p,p'-oxidiphenlene)pyromellitimide]. Similar results are obtained.

EXAMPLE 4

Essentially the same procedures are followed as in (B) and (C) of Eaxample 1 with the exception that, in making up the spinning solution of (B) wherein the linear polymer is 100% poly-[2,2'-(m-phenylene)-5,5'-bibenzimidazole], there is used a finely divided (pulverized) mixture of, by weight, 87.5% of the said benzimidazole and 12.5% of a polybenzothiazole, specifically poly-[2,2'-(1,3-phenylene)-6,6'-bibenzothiazole]. Similar results are obtained.

It is to be understood that the foregoing detailed description is given merely by way of illustration and that many variations may be made therein without departing from the spirit of the invention.

Having described my invention, what I desire to secure by Letters Patent is:

1. The method of producing shaped products from a solution of 5% to 30% by weight of a linear polybenzimidazole dissolved in sulfuric acid containing, by weight, from 70% to 100% $H_2SO_4$, said method comprising precipitating the said polybenzimidazole in approximately its desired shape from the said solution by contacting the latter with a liquid coagulant comprising a solution of sulfuric acid containing, be weight, from about 35% to about 65% $H_2SO_4$ and having a temperature of from about 20° C to about 100° C, thereby to obtain a gelled shaped product.

2. The method as in claim 1 which includes the additional steps of stretching and drying the gelled shaped product.

3. The method as in claim 1 wherein the linear polybenzimidazole is dissolved in sulfuric acid containing, by weight, from 95% to 100% $H_2SO_4$, the temperature of the solution of the said polybenzimidazole when it is contacted with the liquid coagulant is within the range of from about 20° C. to 100° C., and the temperature of the liquid coagulant likewise is within the range of from about 20° C. to 100° C.

4. The method as in claim 3 wherein the concentration of the linear polybenzimidazole in sulfuric acid containing, by weight, from 95% to 100% $H_2SO_4$, is within the range of from about 5% to about 30% by weight, and its temperature when it is contacted with the liquid coagulant is within the range of from about 40° C. to about 80° C.

5. The method as in claim 1 wherein the shaped products are in filamentary form.

6. The method as in claim 1 wherein the linear polybenzimidazole is linear poly-[2,2'-(m-phenylene)-5,5'-bibenzimidazole].

7. The method which comprises dissolving a fiber-formable, linear polybenzimidazole in sulfuric acid containing, by weight, from 95% to 100% $H_2SO_4$ to form a spinning solution containing from about 5% to about 30% of said polybenzimidazole; extruding the said solution at a temperature of from about 40° C. to about 60° C. through a shaped orifice to form filamentary material; immediately after extrusion contacting the filamentary material with a liquid coagulant comprising a solution of sulfuric acid containing, by weight, from about 40% to about 60% $H_2SO_4$, said liquid coagulant being at a temperature within the range of from about 30° C. to about 90° C., whereby there is formed gelled filamentary material; stretching the gelled filamentary material to increase its tensile strength; and drying the stretched filamentary material.

8. The method as in claim 7 wherein the spinning solution is extruded directly into a bath comprising the defined liquid coagulant thereby to form gelled filamentary material.

References Cited

UNITED STATES PATENTS

| | | | |
|---|---|---|---|
| 2,895,948 | 7/1959 | Brinker et al. | 260—78.4 |
| 3,154,613 | 10/1964 | Epstein et al. | 264—211 |
| 3,174,947 | 3/1965 | Marvel et al. | 260—47 |

JULIUS FROME, *Primary Examiner.*

HERBERT MINTZ, *Assistant Examiner.*

U.S. Cl. X.R.

260—30.8; 264—290, 346